United States Patent Office 3,314,947
Patented Apr. 18, 1967

---

3,314,947
1-METHYL-3-[2-(5-NITRO-2-FURYL)VINYL]-Δ²-1,2,4-TRIAZOLIN-5-ONE
Louis Edmond Benjamin, Norwich, N.Y., assignor to The Norwich Pharmacal Company, a corporation of New York
No Drawing. Filed Oct. 23, 1964, Ser. No. 406,178
2 Claims. (Cl. 260—240)

This invention relates to new nitrofuran compounds. It is primarily concerned with the compound 1-methyl-3 [2-(5-nitro-2-furyl)vinyl]-Δ²-1,2,4-triazolin-5-one of the formula:

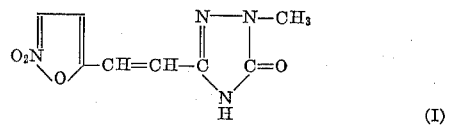

(I)

and the compound 1-ethoxy-3-(5-nitro-2-furan)-2-propenal-2-methyl semicarbazone of the formula:

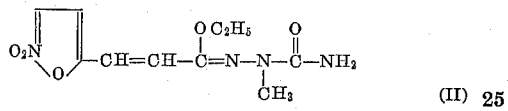

(II)

The compound of Formula I possesses a high order of chemotherapeutic activity. It is capable of inhibiting the growth of microorganisms such as *Staphylococcus aureus*, *Escherichia coli*, *Streptococcus pyogenes*, *Salmonella typhosa*, *Streptococcus agalactiae*, and *Erysipelothrix insidiosa* and is thus adapted to be combined with various carriers in the form of dusts, suspensions, solutions, tablets, pastes and the like to form compositions designed to prevent and eliminate parasitical growth. Furthermore upon oral administration to animals infected with *Escherichia coli*, *Staphylococcus aureus*, *Trypanosoma gambiense* or *Schistosoma mansoni*, the compound of Formula I is capable in far less than toxic amount of preventing mortality and combatting infectious processes induced by these organisms. Doses of the order of from 30–50 mg./kg./day serve to effect the aforesaid results without manifestation or side effects.

For convenient peroral administration the compound of Formula I is readily formulated into suitable dosage forms using excipients and adjuvants common to the pharmaceutical art.

The compound of Formula II is a valuable intermediate in the preparation of the compound of Formula I. Thus, when it is treated with phosphorus oxychloride, ring closure results with the formation of the compound of Formula I.

In order that this invention may be understood and be fully available to those skilled in the art, the following example is supplied:

EXAMPLE

A. *Ethyl 5-nitro-2-furfurylideneacetimidate (NF-1053)*

A 5-l., three neck flask, fitted with a condenser protected by a drying tube, stirrer and gas inlet tube, and surrounded by an ice-salt bath, is charged with a suspension of 255 g. (1.55 moles) of 5-nitro-2-furanacrylonitrile in 2.5 l. of ethanol. Hydrogen chloride is bubbled into the stirred mixture at such a rate that the temperature does not rise above 35°. The addition is continued for an additional 0.5 hour after solution is complete. The mixture is allowed to stand overnight. The mixture is diluted with anhydrous ether to turbidity and chilled thoroughly. The product is filtered, washed with anhydrous ether and dried at 60° to give the product as yellow crystals melting at 226.5–227.5° (dec.) in a yield of 229.6 g. (60%).

B. *1-ethoxy-3-(5-nitro-2-furan)-2-propenal-2-methyl semicarbazone (NF-1057)*

A mixture of 62 g. (0.25 mole) of the compound of A and 22.3 g. (0.25 mole) of 2-methylsemicarbazide in 250 ml. of ethanol is heated at 50–60° for 30 minutes. After cooling in an ice bath, the mixture is filtered. The orange solid is washed with water, isopropanol, and then with ether. A yield of 41 g. (59%) of product is obtained after drying at 60°; M.P. 172–174°. Recrystallization from acetonitrile (15 ml./g.) raises the M.P. to 175.5–177°.

*Analysis.*—Calcd. for $C_{11}H_{14}N_4O_5$: C, 46.81; H, 5.00; N, 19.95. Found: C, 46.60; H, 4.64; N, 20.08.

C. *1-methyl-3-[2-(5-nitro-2-furyl)vinyl]-Δ²-1,2,4-triazolin-5-one (NF-1051)*

34 g. (0.12 mole) of the compound of B is added to phosphorus oxychloride (135 ml.) and heated at reflux for 3–4 minutes. Complete solution occurs and then a yellow solid separates. The mixture is cooled, diluted with ether and filtered. The yellow solid is washed with either and dried at 100° to give 14.5 g. (52%) of product, M.P. 279–280°. Recrystallization from 2-methoxyethanol (20 ml./g.) raises the M.P. to 282–283°.

*Analysis.*—Calcd. for $C_9H_8N_4O_4$: C, 45.76; H, 3.41; N, 23.72. Found: C, 45.71; H, 3.62; N, 23.74.

What is claimed is:
1. The compound of the formula:

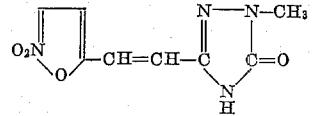

2. The compound of the formula:

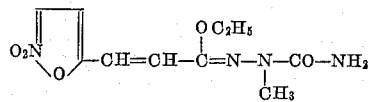

References Cited by the Examiner
UNITED STATES PATENTS
3,232,956   2/1966   Benjamin _____ 260—347.3
FOREIGN PATENTS
197,816   5/1958   Austria.
OTHER REFERENCES
Saikawa, J. Pharm. Soc., Japan, vol. 84, pages 566 to 569, June 1964.

JOHN D. RANDOLPH, *Primary Examiner.*